United States Patent

[11] 3,616,140

[72] Inventors: Robert L. Copeland; Vance A. Chase, both of Marion, Va.
[21] Appl. No.: 730,027
[22] Filed: May 17, 1968
[45] Patented: Oct. 26, 1971
[73] Assignee: Brunswick Corporation

[54] RAIN EROSION RESISTANT MATERIAL FOR AIRBORNE VEHICLE
6 Claims, 7 Drawing Figs.

[52] U.S. Cl. .................................................. 161/68, 52/80, 102/105, 161/183, 161/189, 161/227, 161/247, 244/1, 343/872
[51] Int. Cl. ................................................ B32b 3/12, H01q 1/42
[50] Field of Search .................................. 161/68, 69, 116, 125, 189, 190, 183, 184, 197, 227, 195, 247; 343/872, 872 R, 705, 708; 52/80, 81, 86; 244/1 R, 1 SS; 102/105; 260/47

[56] References Cited
UNITED STATES PATENTS

| | | | |
|---|---|---|---|
| 2,642,370 | 6/1953 | Parsons et al. | 161/203 X |
| 2,755,216 | 7/1956 | Lemons | 156/194 X |
| 3,257,266 | 6/1966 | Sapper | 161/188 |
| 3,301,732 | 1/1967 | Kunz | 161/36 X |

Primary Examiner—Harold Ansher
Assistant Examiner—Henry F. Epstein
Attorney—Hofgren, Wegner, Allen, Stellman & McCord ABSTRACT: A radome or other like structure defining a leading edge of an airborne vehicle, which is of light weight and formed to close tolerances, including a reinforced plastic shell which may be of glass fiber reinforced epoxy or polyester laminate, and a preformed rain erosion resistant coating or "boot" of thermoplastic material on the outer exposed surface. The thermoplastic material is a preformed coating having high electrical transparency or transmissability and good abrasion and impact resistance. The coating can be secured to the shell by a suitable adhesive system.

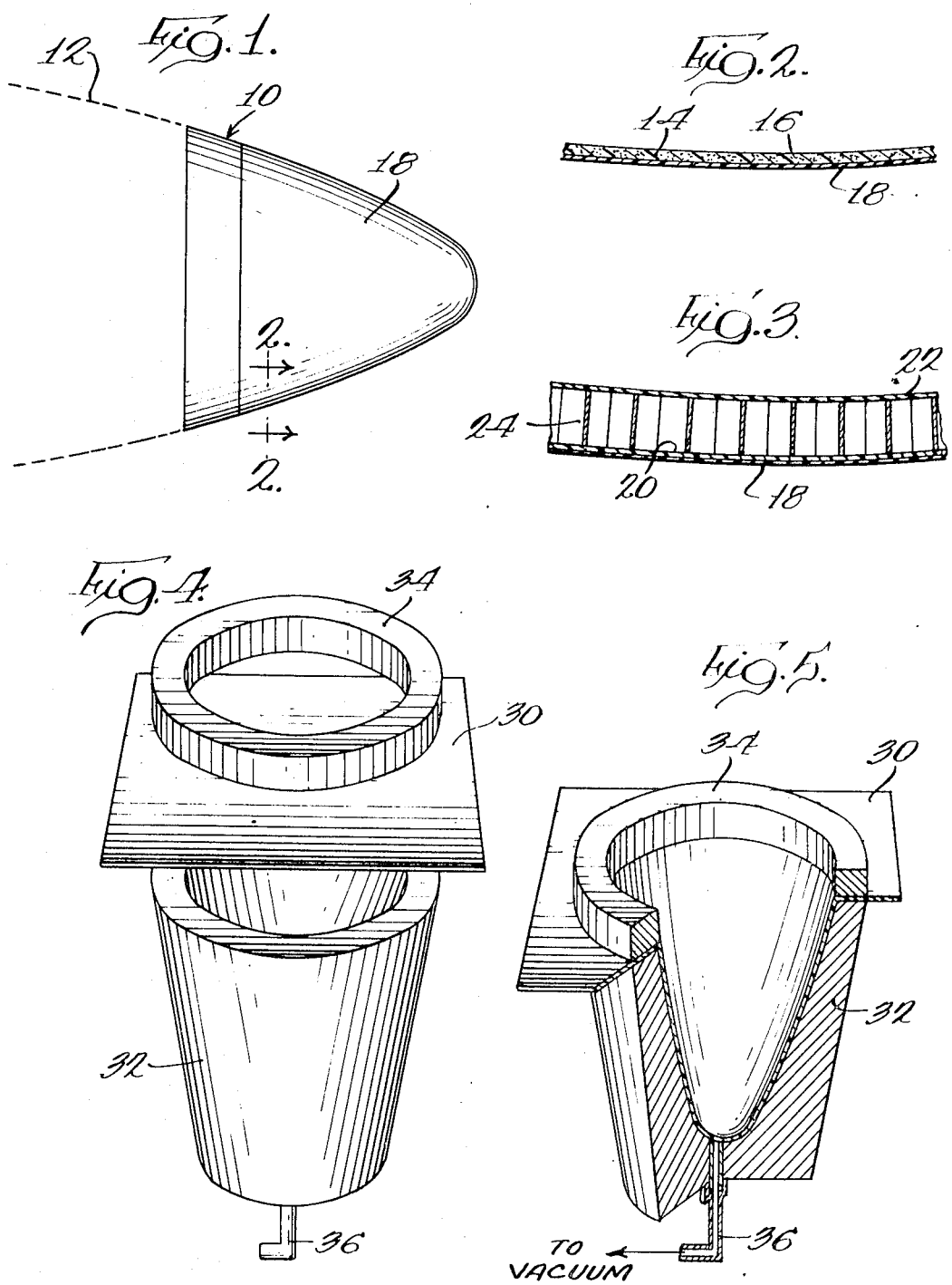

PATENTED OCT 26 1971 3,616,140

RAIN EROSION RESISTANT MATERIAL FOR AIRBORNE VEHICLE

BACKGROUND OF THE INVENTION

1. Field of the Invention

This invention relates to radomes or the like having a preformed rain-erosion-resistant coating or boot applied to the outer surface.

2. Description of the Prior Art

Radomes used in airborne vehicles such as subsonic and supersonic aircraft and missiles are required to move at high speeds through rainstorms, resulting in a phenomenon known as "rain erosion." The impact of rain against the high-speed surface destroys or diminishes the usefulness of the radome by actually eroding and deforming the radome surface. It has been proposed to apply thermosetting neoprene base rubber material or a urethane to the surface for the purpose of protecting against rain erosion. However, it is difficult to form these materials into proper preformed shapes with the close tolerances required for radome rain erosion boot use.

SUMMARY OF THE INVENTION

In accordance with the present invention, there are provided close tolerance preformed thermoplastic rain erosion resistant coatings or boots of good electrical transparency and having other properties such as light weight, thermal resistance and abrasion resistance. The thermoplastic materials useful for the purposes of the present invention are: high molecular weight polyolefins, cross-linked polyolefins, polyhalocarbons, polyarylethers, polycarbonates, polyimides and polyphenylene oxide. The preformed boot is bonded to the leading surface of a radome or the like by a suitable adhesive means.

While illustrative embodiments of the invention are shown in the drawings and will be described in detail herein, the invention is susceptible of embodiments in many different forms and it should be understood that the present disclosure is to be considered as an exemplification of the principles of the invention and is not intended to limit the invention to the embodiments illustrated.

DESCRIPTION OF THE DRAWINGS

FIG. 1 illustrates a radome covered with one embodiment of a preformed rain-erosion-resistant boot in accordance with the present invention;

FIG. 2 is an enlarged fragmentary section along line 2—2 of FIG. 1;

FIG. 3 is a section through another form of radome having a preformed rain-erosion-resistant boot; and FIGS. 4–7 illustrate molds used in compression and vacuum molding of preformed boots which can be used in the radomes of FIGS. 1–3.

DESCRIPTION OF THE PREFERRED EMBODIMENTS

Figure 6:
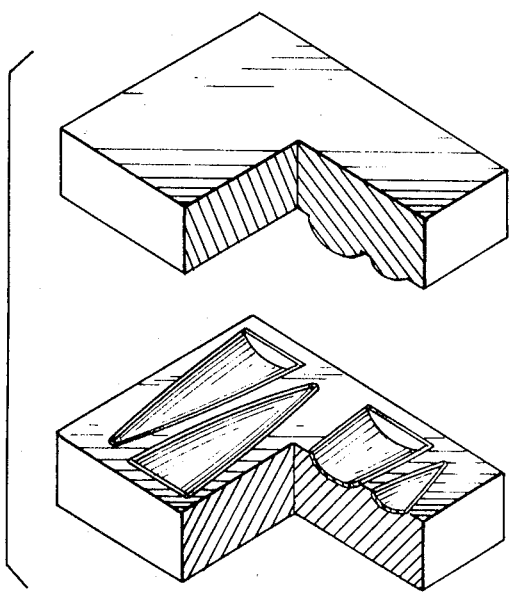

Turning first to FIGS. 1 and 2, there is illustrated a radome 10 which is attached to the leading portion of an aircraft, as indicated in phantom at 12. As best seen in FIG. 2, the radome is composed of polyester or epoxy resin 14 reinforced with glass fibers 16, e.g., one-fourth to one-half inch thick, A rain-erosion-resistant boot 18, e.g., 10- to 30mils thick, is secured to the leading surface of the radome by suitable adhesive. Boot 18 is usually substantially thinner than the glass fiber reinforced structural portion 14 and 16.

The boot 18 can also be used on a radome shell of the sandwich type as seen in FIG. 3, having two glass fiber reinforced plastic skins 20 and 22 adhered to opposite faces of a honeycomb structure 24 with boot 18 applied to the outer surface of the outer skin 20. The honeycomb structure 24 can be replaced by a foam material or by other structural radome materials.

Turning to FIGS. 4 and 5, the boot 18 can be preformed by vacuum forming techniques which involve placing a sheet 30 of the thermoplastic material over a cuplike mold half 32 having an interior mold surface defining the desired form of the coating. The mold ring 34 is then placed over the sheet 30 to hold the sheet in position spanning the opening to mold 32. The thermoplastic film 30 is heated to a plastic condition and a vacuum is applied by a suitable source of suction at vent 36.

Figure 7:
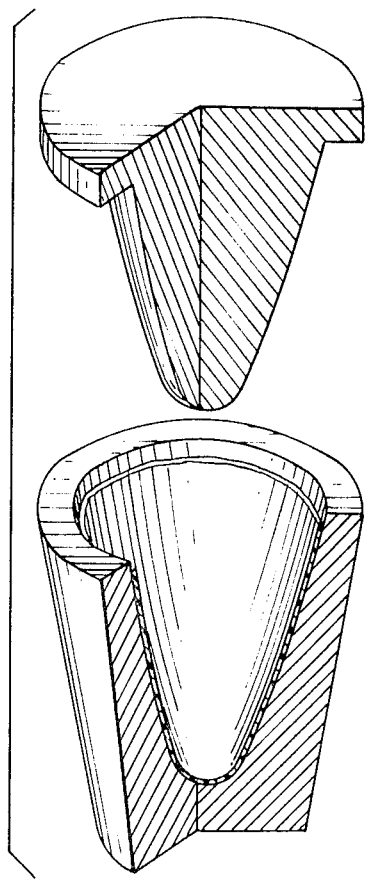

FIGS. 6 and 7 illustrate molds suitable for compression molding of the thermoplastic material. In each instance, the thermoplastic material, preferably in sheet form, is disposed over or introduced into the female-mold half; the mold is heated to convert the thermoplastic material to a plastic state and the male mold is pressed into the female mold to complete the molding operation. In each instance, after the plastic material is formed to the desired shape, it can be solidified by cooling below its molding temperature. The extrusion or molding temperatures for all materials described herein are well known as shown in the art. Additionally, when the thermoplastic material is to be cross-linked during the molding operation, after it has been formed to the desired shape, a mold can be further heated to trigger the cross-linking mechanism. Close tolerances are easily obtained in the boot using the thermoplastic materials, whether cross-linked or not.

The useful thermoplastic materials for molding are true thermoplastics, i.e., they can be melted and resolidified by cooling although cross-linking mechanisms can be used to cross-link the thermoplastic material during the molding operation. Advantageously, the thermoplastic material can have a dielectric constant in the range of 2.0 to 3.5 and a loss tangent below 0.05, both at 9.375 GHz. These materials can also resist a rain density of 2 inches per hour at a speed of 500 m.p.h. and absorb a significant proportion of the impact to protect the radome substrate and have high-abrasion resistance; although some have melting points of 200° to 250° F. or lower, preferably their melting and oxidative deterioration temperatures are above 250° F.

Among the preferred thermoplastic materials are the following:

1. Polyphenylene oxide having the structure

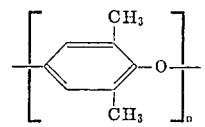

wherein n designates a chain of repeating units, as described in the 1966 issue of Modern Plastics Encyclopedia by R. B. MacCallum and P. Shenian. The polyphenylene oxides are available from General Electric Co. under the product designations PPO 531, PPO 534, PPO 631, PPO 681.

2. Polyarylethers, including polysulfones having the structure

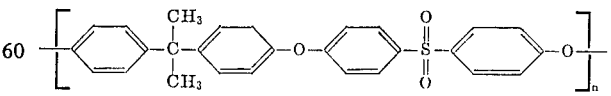

wherein *n* is an integer of from about 60 to about 120. The polysulfone is available from Union Carbide Corporation under the product designation Bakelite Sulfone Resin 47.

3. Polyhalocarbons such as fluorocarbons having the structure

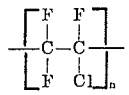

wherein n represents the number of repeating monomer units in the polymer. Suitable fluorocarbons are available from Allied Chemical Corporation under the trade designation CTFE Fluorocarbon.

4. Polycarbonates having the structure

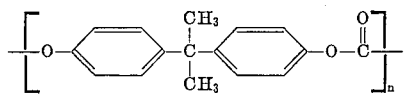

wherein n represents the number of repeating monomer units in the polymer.

5. Polyolefins including polyethylene and polypropylene having the structure

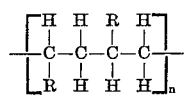

wherein R is hydrogen or methyl and n represents a molecular weight in the range of 2 to 5 million in noncross-linked polymers, e.g., as available from Hercules Incorporated as HiFax 1900. Where the polyolefins are cross-linkable they can be much lower molecular weight, e.g., down to 10,000 or lower. The cross-linkable polyolefins, e.g., Petrothene XL cross-linkable polyethylene compounds available from U.S.I. Chemicals, cross-link at elevated temperatures above their melt temperatures.

The following examples are offered by way of illustration of the present invention and are not intended as limitations thereof:

EXAMPLE I

Polysulfone sheet stocks of 0.02 and 0.04 inch in thickness were molded by placing two plys in a match metal mold and heating the materials to 300° F., at which time a mold pressure of 200 p.s.i.g. was applied. The temperature was raised gradually to 500° F. Then the mold was cooled to 200° F. and the mold product or boot was recovered. When inspected under a microscope, the boot was found to be void free and of good quality and the bond between the two plys was excellent. Flat and curved substrates were fabricated from glass fiber reinforced epoxy resin press molded at 300° F. and the polysulfone preformed boot was secured to the substrate using epoxy adhesive.

EXAMPLE II

Example I was repeated using a ultra-high molecular weight polyethylene marketed by Hercules Powder Company under the trade name HiFax 1900 and a mold temperature of 350° F. for 30 minutes. The resulting preformed boot was applied to a substrate as in example I.

EXAMPLES III–VIII

Six preformed rain-erosion-resistant coatings were molded by compression moldings at the mold temperatures, pressures and times shown in table I using six different materials as identified in table I. The mold was cooled prior to removing the preformed coating, as also shown in table I.

TABLE I

| Ex. | Material | Mold temp., °F. | Pressure, p.s.i. | Time, min. | Cool to— |
|---|---|---|---|---|---|
| III | Polysulfone | 450 | 200 | 10 | 200° F. |
| IV | Cross-linkable polyethylene | 250 | 200 | 10 | 150° F. |
| V | Polyethylene, HiFax 1900 | 350 | 500 | 10 | 200° F. |
| VI | Fluorocarbon CTFE | 450 | 200 | 10 | 200° F. |
| VII | Polyethylene, HiFax 2600 | 300 | 200 | 10 | 200° F. |
| VIII | Polyphenylene oxide | 550 | 200 | 10 | 200° F. |

EXAMPLES IX–XI

In these three examples, preformed coatings were produced by vacuum forming techniques using sheets of the materials identified in table II. The mold was provided having the proper shape for producing the desired shape of preformed coating and sheets of the materials of table II were vacuum formed in the mold at the mold temperatures and material temperatures shown in table II.

TABLE II

| Example | Material | Mold Temp. | Material Temp. |
|---|---|---|---|
| IX | Cross-linkable Polyethylene | 100° F. | 250° F. |
| X | Polysulfone | 300° F. | 500° F. |
| XI | Polyethylene, HiFax 2600 | 100° F. | 300° F. |

EXAMPLE XII

A specimen was prepared using polyphenylene oxide as a primer. The interface ply of the substrate was prepared by loading 20 percent by weight of polyphenylene oxide powder in Epon 828 resin and preparing a prepreg-ply with this resin. The ply was laminated to the substrate using a vacuum bag and 250° F. for 1 hour. The primed substrate was grit blasted lightly to remove excess resin and to expose the polyphenylene oxide particles. The substrate and a piece of polyphenylene oxide film were brushed with dichloroethylene solvent. The solvent partially dissolved the polyphenylene oxide on the primed surface and the film-causing tacky surfaces. The part was assembled and cured 1 hour at 250° F. under vacuum. The adhesion achieved in this process was excellent. The reason for the good bond was the epoxy to epoxy bond created by the wet resin layup of the interface ply and the PPO to PPO bond created by the partially exposed polyphenylene oxide particles.

Coated substrates made in accordance with the foregoing examples were subjected to a rain erosion test. In the test, specimens were mounted on the end of a whirling arm which propels the specimen at a speed of 500 m.p.h. in a circular path. 2 inches of simulated rainfall per hour were applied in the environment through which the specimens were propelled. For comparison purposes, a neoprene coating applied to a substrate was also tested. It was found that the neoprene-coated substrates ran only 0.5 to 0.7 minutes before they failed due to rain erosion. The neoprene was unable to dissipate the raindrop impact at 500 m.p.h. speed before the force of the impact reached the substrate. Because of this, the substrate was damaged and adhesion was lost. Also, for comparison purposes, brittle plastics were tested as coatings, and it was found that these materials did not dissipate the impact and rain erosion also began quickly. The failure times and type of failure of boots of various materials, used in the above examples, are reported in table III below.

TABLE III

| Boot Material | Boot Thickness (mils) | Failure Time (min.) | Failure (Type) | Comments |
|---|---|---|---|---|
| Hifax 1900 | 33 | 1.0 | Adhesion | Very minute erosion |
| Hifax 1900 (Black) | 30 | 3.0 | Erosion | |
| Hifax 1900 (Black) | 30 | 4.0 | Erosion | |
| Cross-linked Polyethylene (Natural) | 30 | 2.5 | Erosion-Adhesion | |
| " | 30 | 4.0 | " | No failure |
| Cross-linked Polyethylene | | | | |

Table III—Continued

| | | | | |
|---|---|---|---|---|
| (Black) | 30 | 2.5 | Adhesion-Erosion | |
| | 30 | 2.5 | Some erosion | No failure |
| Polyphenylene Oxide | 30 | 2.0 | Adhesion-Erosion | Failure primarily Adhesion |
| " | 30 | 2.0 | Adhesion | Little erosion |
| Polyphenylene Oxide (Annealed) | 15 | 1.5 | Erosion | Solvent spray |
| " | 30 | 2.0 | Adhesion- | |

Table III—Continued

| | | | | |
|---|---|---|---|---|
| Polysulfone | 18 | 0.5 | Erosion Adhesion | Solvent bond Air pockets in bondline |
| Polysulfone | 18 | 1.3 | Adhesion | Substrate & Adhesive Failure |
| Fluorocarbon CTFE | 19 | 0.5 | Adhesion | Stress Cracks Visible |
| HiFax 1900 | 10 | 3.3 | Adhesion | |

Abrasion tests were also run on some of the materials used as radome boots. In the abrasion tests, a flow of 30 grams per second grit was directed at the specimen surface under a pressure of 20 p.s.i.g. from a nozzle 3 inches from the specimen surface in a perpendicular impingement direction. The tests were run for a period of 1,800 seconds in most cases and the results are shown in table IV below.

TABLE IV

| Material | Time (sec) | Erosion (mils) | Index of Erosion Sec/Mil |
|---|---|---|---|
| Hifax 1900 | 1800 | 3 | 600 |
| Polysulfone | 1800 | 20 | 90 |
| Polyphenylene Oxide | 600 | 7 | 43 |

Table IV—Continued

| | | | |
|---|---|---|---|
| Cross-linked Polyethylene HiFax 1900* | 1800 | 3.5 | 535 |
| Heated to 350° F. | 1800 | 3 | 600 |

*This HiFax 1900 specimen was heated to 350° F. and held for 30 minutes at this temperature. The purpose of this was to check for possible thermal depolymerization of the high molecular weight chain polyethylene which would result in a less abrasion resistant material. The abrasion test indicates that this is not a problem of concern.

Other advantageous properties of some of the boot materials were measured and are reported in table V.

TABLE V

| Material | Dielectric constant at 9.375 GHz | Loss tangent at 9.375 GHz | Hardness | Impact resistance | Modulus of elasticity |
|---|---|---|---|---|---|
| Polyethylene, HiFax 1900 | 2.26 | 0.0016 | Rockwell R 38 | Izod, notched >18 ft.-lb./in. | $1.0 \times 10^5$ p.s.i. in tensile. |
| Cross-linked polyethylene | 2.54 | 0.0030 | Shore "D" 76 | Izod, unnotched 7 ft.-lb./in. | $3.3 \times 10^5$ p.s.i. in tensile. |
| CTFE | 2.70 | 0.0270 | Shore "D" 72 | Izod, notched 27 ft.-lb./in. | $2.0 \times 10^5$ p.s.i. in flexural. |
| Polyphenylene oxide | 2.51 | 0.0009 | Rockwell M 70 | Izod, notched 1.2-1.6 ft.-lb./in. | $3.9 \times 10^5$ p.s.i. in tensile. |
| Polysulfone | 2.95 | 0.0049 | Rockwell R 120 | Izod, notched 1.3 ft.-lb./in. | $3.6 \times 10^5$ p.s.i. in tensile. |

It will be apparent from the foregoing that the present invention provides new and useful radome boots and radome assemblies equipped with such boots. The boots are rain erosion resistant and are capable of protecting the radome in flight at high speeds through heavy rain. The boots are of thermoplastic materials and are formed to excellently close tolerances.

We claim:

1. A structure for defining a leading surface of a vehicle to be propelled at high speeds through the air comprising: a rigid hollow curviplanar reinforced plastic member having an outer leading streamlined surface tapering from a closed leading end to an open trailing end in a precise contour and a preformed rain-erosion-resistant covering layer of generally uniform thickness on said outer surface shaped to close tolerance with the outer surface and bonded thereto, said covering layer comprising solely a thermoplastic, electrically transmissible, abrasion resistant and impact resistant organic polymer, said polymer is selected from the class consisting essentially of a 2 to 5 million molecular weight polyolefin or cross-linked polyolefin.

2. The structure of claim 1 wherein said covering layer has an abrasive index of erosion of approximately 600 or less.

3. The structure of claim 1 wherein said plastic member is a sandwich of two opposing skins of reinforced plastic secured to opposing surfaces of an open honeycomb core.

4. The structure of claim 1 wherein said thermoplastic material is polyethylene having a molecular weight in the range of 2 to 5 million.

5. The structure of claim 1 wherein said thermoplastic material is cross-linked polyethylene.

6. The structure of claim 1 including adhesive means tightly bonding the covering layer to said outer surface.